United States Patent
Tebano et al.

(10) Patent No.: US 8,833,151 B2
(45) Date of Patent: Sep. 16, 2014

(54) METHOD AND SYSTEM FOR ESTIMATING THE INFLATION PRESSURE OF A TIRE

(75) Inventors: Riccardo Tebano, Milan (IT); Giorgio Audisio, Milan (IT); Anna Paola Fioravanti, Milan (IT)

(73) Assignee: Pirelli Tyre S.p.A., Milan (IT)

(*) Notice: Subject to any disclaimer, the term of this patent is extended or adjusted under 35 U.S.C. 154(b) by 0 days.

(21) Appl. No.: 13/994,302

(22) PCT Filed: Dec. 21, 2011

(86) PCT No.: PCT/IB2011/003136
§ 371 (c)(1),
(2), (4) Date: Jun. 14, 2013

(87) PCT Pub. No.: WO2012/085649
PCT Pub. Date: Jun. 28, 2012

(65) Prior Publication Data
US 2013/0263655 A1  Oct. 10, 2013

Related U.S. Application Data

(60) Provisional application No. 61/467,244, filed on Mar. 24, 2011.

(30) Foreign Application Priority Data

Dec. 23, 2010  (IT) .............................. MI2010A2382

(51) Int. Cl.
*G01M 17/02* (2006.01)
*B60C 23/06* (2006.01)

(52) U.S. Cl.
CPC .............. *B60C 23/06* (2013.01); *B60C 23/064* (2013.01)
USPC ......................................................... 73/146

(58) Field of Classification Search
None
See application file for complete search history.

(56) References Cited

U.S. PATENT DOCUMENTS

| 5,801,305 | A | * | 9/1998 | Kawai et al. ................. 73/146.2 |
| 6,060,984 | A | * | 5/2000 | Braun et al. .................. 340/442 |
| 6,729,179 | B2 | * | 5/2004 | Crema et al. .................... 73/146 |
| 2007/0171034 | A1 | * | 7/2007 | Mancosu et al. ............. 340/438 |
| 2007/0240501 | A1 | | 10/2007 | Mancosu et al. | |

(Continued)

FOREIGN PATENT DOCUMENTS

DE  10 2006 028 412  12/2007
EP  1 293 362  3/2003

(Continued)

OTHER PUBLICATIONS

International Search Report from the European Patent Office for International Application No. PCT/IB2011/003136, mailed Jul. 17, 2012.

(Continued)

*Primary Examiner* — Andre Allen
(74) *Attorney, Agent, or Firm* — Finnegan, Henderson, Farabow, Garrett & Dunner, L.L.P.

(57) ABSTRACT

A method and system for estimating the inflation pressure of a tire in which data representative of the deformation undergone by the tire on a rolling surface are obtained. The obtained data are processed so as to obtain a first quantity representative of the extent of the deformation within a first deformation region substantially corresponding to the footprint between the tire and the rolling surface and a second quantity, different from the first quantity, representing the extent of the deformation in a second deformation region, said second region including the first deformation region and having a circumferential extension greater than the circumferential extension of the first deformation region, the second quantity being obtained starting from at least a part of the obtained data, which corresponds to a portion of said second deformation region that is external to the footprint. The pressure is estimated based on the first quantity and the second quantity thus obtained.

13 Claims, 5 Drawing Sheets

(56) References Cited

U.S. PATENT DOCUMENTS

| | | | |
|---|---|---|---|
| 2007/0240502 A1 | 10/2007 | Morinaga et al. | |
| 2007/0255510 A1 | 11/2007 | Mancosu et al. | |
| 2012/0211997 A1* | 8/2012 | Bonisoli et al. | 290/1 R |
| 2013/0211741 A1* | 8/2013 | Tebano et al. | 702/42 |
| 2013/0261991 A1* | 10/2013 | Tebano et al. | 702/41 |
| 2013/0263655 A1* | 10/2013 | Tebano et al. | 73/146.3 |

FOREIGN PATENT DOCUMENTS

| | | |
|---|---|---|
| EP | 1 757 464 A1 | 2/2007 |
| WO | WO 2012/085655 | 6/2012 |

OTHER PUBLICATIONS

Written Opinion of the International Searching Authority from the European Patent Office for International Application No. PCT/IB2011/003136, mailed Jul. 17, 2012.

Hölscher et al.; "Modeling of Pneumatic Tires by a Finite Element Model for the Development a Tire Friction Remote Sensor", Preprint Submitted to Computers and Structures, pp. 1-17, (2004).

* cited by examiner

METHOD AND SYSTEM FOR ESTIMATING THE INFLATION PRESSURE OF A TIRE

CROSS REFERENCE TO RELATED APPLICATIONS

This application is a national phase application based on PCT/IB2011/003136, filed Dec. 21, 2011, which claims the priority of Italian Patent Application No. MI2010A002382, filed Dec. 23, 2010, and the benefit of U.S. Provisional Application No. 61/467,244, filed Mar. 24, 2011, the content of each application being incorporated herein by reference.

BACKGROUND OF THE INVENTION

1. Field of the Invention

The invention concerns a method and a system for estimating the inflation pressure of a tire.

2. Description of the Related Art

The incorporation of electronic monitoring devices within tires is taking on increasing importance in order to increase the safety of vehicles.

Such devices can, for example, include sensors and other components adapted for obtaining information concerning various quantities of a tire like, for example, temperature, pressure, acceleration, number of revolutions of the tire, speed of the vehicle, load acting on the tire and the like.

H. Holscher at al. ("Modeling of Pneumatic Tires by a Finite Element Model for the Development a Tire Friction Remote Sensor", preprint submitted to Computers and Structures, pages 1-17, 28 Oct. 2004) describe a sensor of curvature of a tire to determine the actual load of a tire for a given pressure or to determine whether the pressure of a tire is correct for the actual load.

SUMMARY OF THE INVENTION

The Applicant faced the technical problem of reducing the number of sensors used by a monitoring device of a tire. This in order to reduce the costs, the overall dimensions and the energy consumption of the monitoring device.

In this context, the Applicant observed that a pressure sensor of the direct type is typically equipped with a membrane exposed to air, which involves problems of assembly, strength and reliability of the monitoring device.

The Applicant thus faced the technical problem of eliminating the sensor of inflation pressure of the tire so as to simplify the assembly of the monitoring device and make a monitoring device that is sealed, strong and reliable.

The Applicant observed that, in general, a tire on a rolling surface undergoes a deformation through the effect of the load acting on the tire and due to the fact that the tire is made from elastically deformable material.

The Applicant observed that the tire deforms at a first deformation region, substantially corresponding to the footprint, and at a second circumferentially wider deformation region, comprising the first region.

The Applicant found that from data representative of the deformation of the tire it is possible to obtain two different quantities, respectively representative of the extent of the deformation in the first region and of the extent of the deformation in the second region, which both depend on the inflation pressure of the tire and that, in different load and inflation pressure conditions, are (although correlated) not directly proportional to one another.

The Applicant found that from the aforementioned quantities it is possible to estimate the inflation pressure of the tire and that such an estimation can be advantageously carried out without the need to know the load acting on the tire.

In a first aspect thereof, the present invention thus relates to a method for estimating the inflation pressure of a tire, said method comprising:
- obtaining data representative of the deformation undergone by the tire on a rolling surface;
- processing the obtained data in order to obtain a first quantity $\beta$ representative of the extent of the deformation within a first deformation region substantially corresponding to the footprint between the tire and the rolling surface and a second quantity $\sigma$, different from the first quantity, representing the extent of the deformation in a second deformation region, said second region comprising the first deformation region and having a circumferential extension greater than the circumferential extension of the first deformation region, the second quantity $\sigma$ being obtained starting from at least a part of the obtained data, which corresponds to a portion of said second deformation region that is external to the footprint;
- estimating the pressure on the basis of the first quantity $\beta$ and the second quantity $\sigma$ thus obtained.

In a second aspect thereof, the present invention also relates to a system for estimating the inflation pressure of a tire, said system comprising at least one processing unit adapted to:
- obtain data representative of the deformation undergone by the tire on a rolling surface;
- process the obtained data in order to obtain a first quantity $\beta$ representative of the extent of the deformation within a first deformation region substantially corresponding to the footprint between the tire and the rolling surface and a second quantity $\sigma$, different from the first quantity, representing the extent of the deformation in a second deformation region, said second region comprising the first deformation region and having a circumferential extension greater than the circumferential extension of the first deformation region, the second quantity $\sigma$ being obtained starting from at least a part of the obtained data, which corresponds to a portion of said second deformation region that is external to the footprint;
- estimate the pressure on the basis of the first quantity $\beta$ and the second quantity $\sigma$ thus obtained.

In the present description and subsequent claims:
- the expression "load acting on a tire" is used to indicate a force acting on the tire perpendicular to the rolling surface;
- the expression "crown portion" of a tire is used to indicate a portion of the tire that extends between the sidewalls thereof according to a lateral direction of the tire;
- the expression "quantities $\beta$ and $\sigma$ not directly proportional to one another" is used to indicate that $\beta \neq k*\sigma$, where k is a constant;
- the terms "lateral" and "laterally" are used to indicate quantities measured in a direction parallel to the rotation axis of the tire;
- the terms "radial" and "radially" are used to indicate quantities measured in a direction perpendicular to the rotation axis of the tire;
- the terms "longitudinal", "longitudinally", "circumferential" and "circumferentially" are used to indicate quantities measured tangentially to the tire and perpendicularly to the lateral direction.

The present invention in at least one of the aforementioned aspects can have at least one of the following preferred characteristics.

In an embodiment, the first quantity β is representative of the circumferential extension of said first deformation region.

In another embodiment, the first quantity β is representative of a change of position undergone within the footprint by a prefixed crown portion, with respect to a predetermined point of reference.

In an embodiment, the second quantity σ is representative of the circumferential extension of said second deformation region.

The data representative of said deformation can be selected from the group comprising: data representative of an acceleration component to which a prefixed crown portion is subjected, data representative of a speed component of a predetermined crown portion and data representative of a change of position of a prefixed crown portion with respect to a predetermined point of reference.

Advantageously, the data representative of the deformation are obtained by causing rotation of the tire on the rolling surface.

In an embodiment, the system for estimating the inflation pressure also comprises the tire.

Advantageously, the system also comprises a monitoring device operatively associated with the tire, said monitoring device being adapted to obtain the data representative of said deformation.

The monitoring device is advantageously devoid of a direct pressure sensor.

In an embodiment, the monitoring device comprises an accelerometer fixed on a crown portion of the tire.

Advantageously, the data representative of said deformation are obtained by said accelerometer.

In an embodiment, the monitoring device comprises a sensor adapted to determine the position of a prefixed crown portion with respect to a predetermined point of reference.

Advantageously, the data representative of said deformation are obtained by said position sensor.

BRIEF DESCRIPTION OF THE DRAWINGS

Further characteristics and advantages of the present invention will become clearer from the following detailed description of some exemplary embodiments thereof, provided just as non-limiting examples, said description being made with reference to the attached drawings, in which.

DETAILED DESCRIPTION OF THE INVENTION

Figure 1:
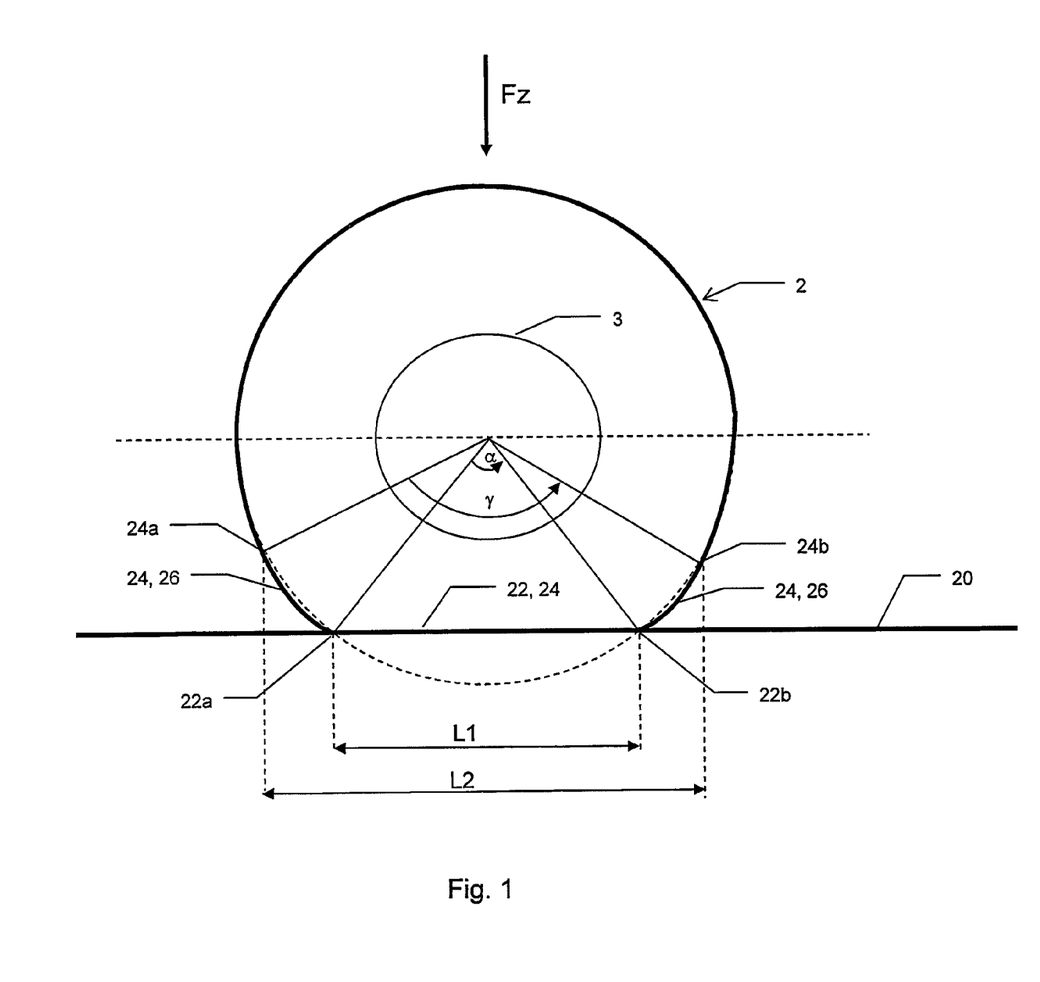
FIG. 1 schematically shows a deformed tire.

FIG. 1 schematically shows a tire 2 on a rolling surface 20 (for example a road surface).

The tire 2 is mounted on a rim 3 and can be mounted on any type of vehicle (not shown), like for example automobiles, vehicles intended for transporting goods, such as trucks or lorries etc.

In virtue of the load acting on the tire (for example once it is mounted on a vehicle) and of the fact that the tire 2 is made from elastically deformable material, the tire 2 undergoes a deformation.

In FIG. 1 the load is represented by the arrow Fz perpendicular to the rolling surface 20

As schematically shown in FIG. 1, such a deformation involves a circumferential region 24 of the tire 2, defined between two circumferential ends 24a, 24b, in which the shape of the tire differs from a substantially circular shape (shown with a broken line in FIG. 1).

The circumferential region 24 is positioned in a lower portion of the tire 2 facing the rolling surface 20.

The circumferential region 24 comprises the footprint 22, defined between two circumferential ends 22a, 22b, and two regions 26 external to the footprint 22, respectively defined between two circumferential ends 24a, 22a and 22b, 24b.

The Applicant observed that from data representative of the deformation undergone by the tire it is possible to identify two regions of deformation: a first deformation region substantially corresponding to the footprint 22 and a second circumferentially wider deformation region, comprising the footprint 22, corresponding to at least part of the circumferential region 24.

The Applicant also found that from data representative of the deformation undergone by the tire it is possible to obtain two different quantities β and σ, respectively representative of the extent of the deformation within the first deformation region and of the extent of the deformation within the second deformation region, which both depend on the inflation pressure of the tire 2 and on the load acting on the tire 2 and that, in different load and inflation pressure conditions, are (although correlated) not directly proportional to one another.

In particular, the Applicant found that the two quantities β and σ are not directly proportional to one another when the second quantity σ is obtained from at least a part of the data representative of the deformation that corresponds to a portion of the second deformation region which is external to the footprint 22.

From these observations, the Applicant found that the inflation pressure of the tire can be estimated based on the two quantities β and σ and that such an estimation can be advantageously carried out without needing to know the load acting on the tire.

The Applicant observes that the quantities β and σ can represent the extent of the deformation in terms, for example, of circumferential extension of the first and of the second deformation region.

For example, the circumferential extension can be determined in terms of angular extension (see, for example, the angles α and γ of FIG. 1), in terms of subtended chord length (see, for example, the lengths L1 and L2 of FIG. 1) or in terms of length taken along the circumferential profile of the tire. The angle α can be between 5° and 40° whereas the angle γ will typically be less than or equal to 180°.

The quantities β and σ can represent the extent of the deformation also in terms of change of position (determined with respect to an undeformed tire) undergone, within one of the two regions, by a prefixed crown portion of the tire 2, with respect to a predetermined point of reference.

For example, the change of position can be determined in terms of change of radial distance between the prefixed crown portion to the centre of the tire, with respect to an undeformed tire.

The data representative of the deformation undergone by the tire 2 can be obtained during the rolling of the tire 2 by a suitable sensor.

Such a sensor can, for example, be an accelerometer or a position sensor.

The position sensor can be an optical or magnetic device adapted to determine the position of a prefixed crown portion with respect to a predetermined point of reference (like, for example, the radial distance between the crown portion and the centre of the tire, or a prefixed point of the rim on which the tire is mounted), during the rolling of the tire.

Figure 7:
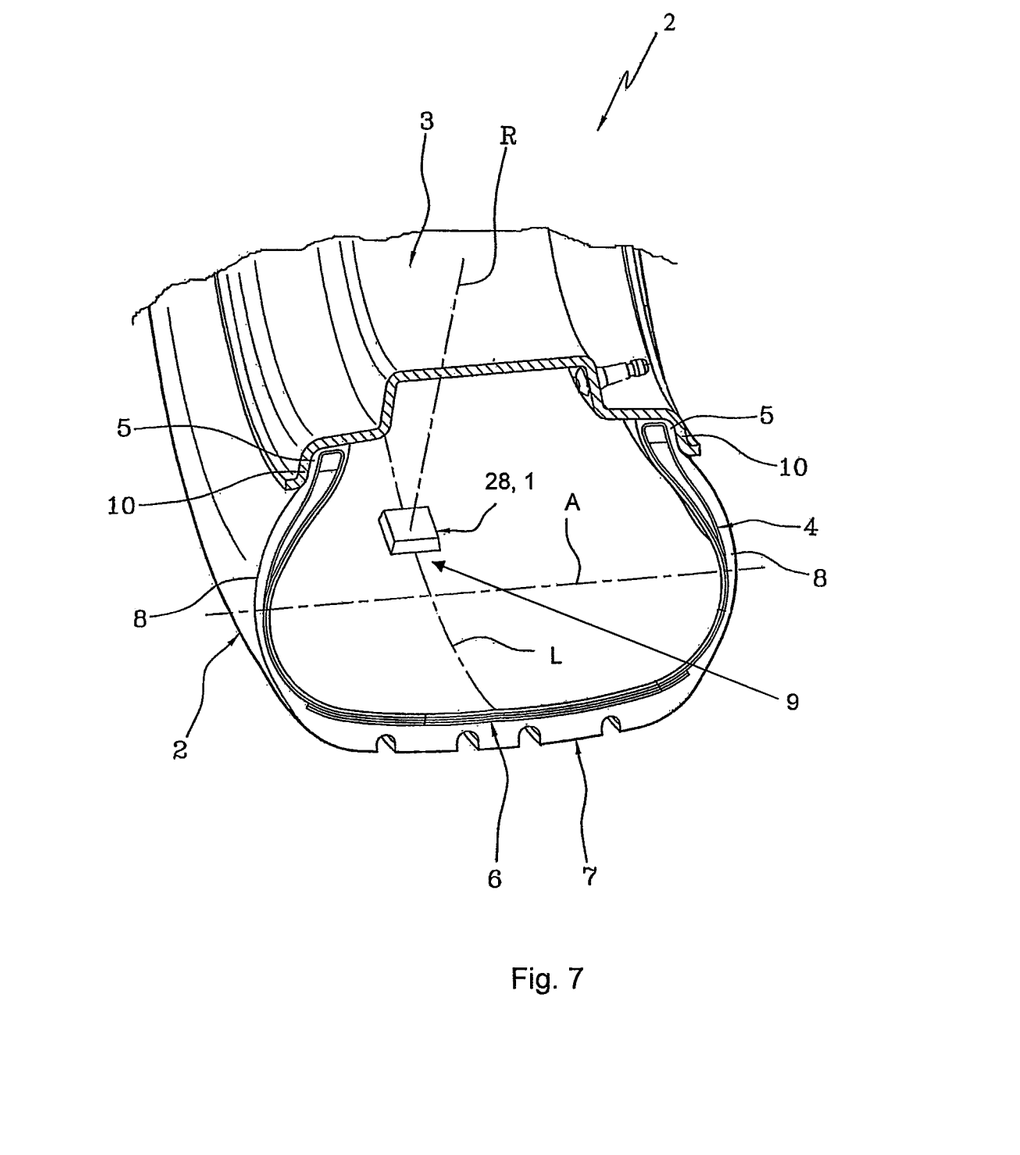
FIG. 7 schematically shows a portion of tire comprising a monitoring device.

FIG. 7 shows a portion of a tire 2 that can be used in a system for estimating the inflation pressure of a tire according to the present invention.

The tire 2 comprises a monitoring device 28 that in turn comprises the aforementioned sensor, indicated with reference number 1.

In FIG. 7, the letters "R", "L" and "A" respectively indicate a radial direction, a longitudinal direction (also called tangential or circumferential) and a lateral direction (also called axial) of the tire.

The tire 2 is mounted on a rim 3. It can be mounted on any type of vehicle, like for example automobiles, vehicles intended for transporting goods, such as trucks or lorries, etc.

The tire 2 is preferably arranged to be used on vehicles provided with electronic devices installed on board, adapted to cooperate and interact with the monitoring device 28.

The tire 2 comprises a carcass structure 4, not illustrated in detail, configured according to a substantially toroidal configuration and engaged, through its opposite circumferential edges, with two annular anchoring structures (usually identified by the name "bead cores"), each of which is located in a region 5 usually identified by the name "bead".

The carcass structure 4 has a belt structure 6 comprising one or more belt strips applied to it, in a circumferentially outer position.

On the belt structure 6, in a circumferentially outer position, there is a tread band 7 on which longitudinal and/or transversal recesses are typically formed, arranged to define a desired tread pattern.

The tire 2 also comprises a pair of so-called sidewalls 8 applied laterally on opposite sides on the carcass structure 4.

Reference number 9 indicates a crown portion of the tire 2 that extends between the sidewalls 8, according to a lateral direction of the tire.

The inner surface of the tire is typically coated with a sealing layer, or so-called "liner", comprising one or more layers of elastomeric material that is impermeable to air, adapted to ensure the hermetic seal of the tire itself.

Advantageously, as illustrated in FIG. 7, the monitoring device 28 is fixed at a crown portion 9, preferably on the liner of the tire 2, through a suitable fastening element (not shown).

Preferably, the monitoring device 28 is arranged substantially at the equatorial plane of the tire 2.

The fastening element is advantageously adapted to conform to the deformations undergone by the structure of the tire during rolling, in order to keep the fastening of the monitoring device 28 to the liner stable over time.

Advantageously, as well as the sensor 1, the monitoring device 28 can also comprise other sensors (not shown) adapted to measure physical quantities of interest of the tire like, for example, the temperature.

Thanks to the invention, the monitoring device 28 can advantageously be devoid of a direct pressure sensor.

Advantageously, the monitoring device 28 also comprises a radio-frequency transmitter (not shown).

The radio-frequency transmitter is adapted to transmit, through an antenna (not shown), data relating to the measured physical quantities, to a receiver (not shown) outside of the tire 2. The receiver can be located on the vehicle on which the tire is mounted.

The data coming from the sensor 1 are advantageously processed (optionally with initial filtering and/or conversion into digital form) by at least one processing unit (i.e. one or more processing units), which can be included in the monitoring device 28 and/or in the receiver outside of the tire 2, so as to determine the inflation pressure of the tire.

Said at least one processing unit comprises hardware and/or software modules adapted to implement the method for estimating the inflation pressure of the tire according to the invention.

In particular, such modules are advantageously adapted to process the data representative of the deformation coming from the sensor 1 so as to obtain the quantities $\beta$ and $\sigma$ and to estimate the inflation pressure of the tire based on such quantities.

For example, in the case in which the sensor 1 comprises a tri-axial accelerometer, the quantities $\beta$ and $\sigma$ can be obtained by processing:

- data representative of at least one from radial component and longitudinal component of the acceleration measured by the accelerometer;
- data representative of at least one from radial component and longitudinal component of the speed of a prefixed crown portion during at least one revolution of a tire, obtainable by processing (for example integrating) the signal measured by the accelerometer; and/or
- data representative of the change, during at least one revolution of a tire, of at least one from radial and longitudinal position of a prefixed crown portion with respect to the centre of the tire or other predetermined point of reference, also obtainable by processing (for example integrating twice) the signal measured by the accelerometer, or through a position sensor.

Figure 2:
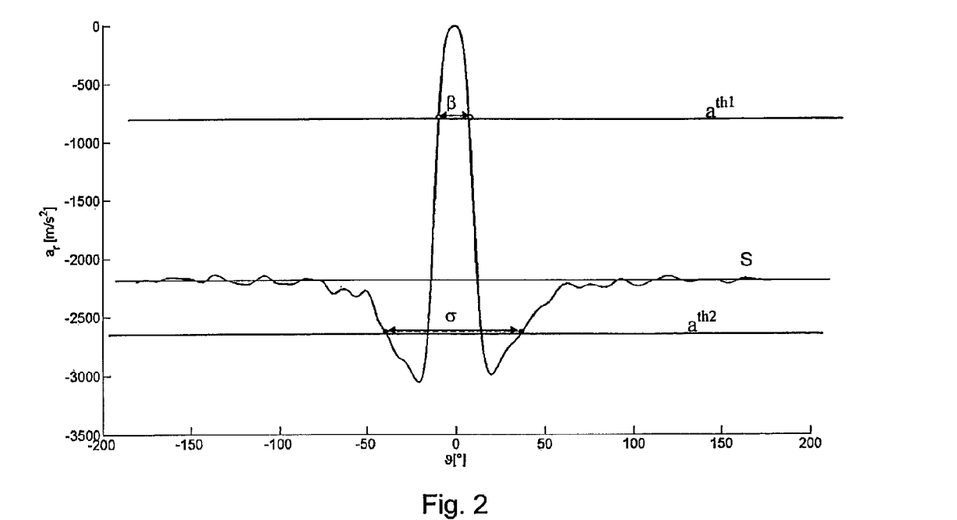
FIG. 2 shows a curve representative of an example of acceleration radial component to which a prefixed crown portion is subjected during at least one revolution of a tire.

As an example, FIG. 2 shows an example of acceleration radial component obtained, during a revolution of a tire, by filtering the signal measured by an accelerometer mounted on a crown portion of a tire (on the liner, substantially at the equatorial plane), as a function of the angular position of the accelerometer with respect to the centre of the footprint ($\theta=0$ indicates an angular position of the accelerometer at the centre of the footprint, $\theta>0$ indicates angular positions after the centre of the footprint, $\theta<0$ indicates angular positions before the centre of the footprint, $\theta=\pm180°$ indicates an angular position of the accelerometer diametrically opposite the centre of the footprint).

The curve refers to a Pzero Rosso™ 225/50 R17 tire produced by the Applicant, mounted on the front right wheel of an Alfa Romeo, Alfa 159 travelling in a straight line at a speed of 60 km/h on dry asphalt.

Figure 4:
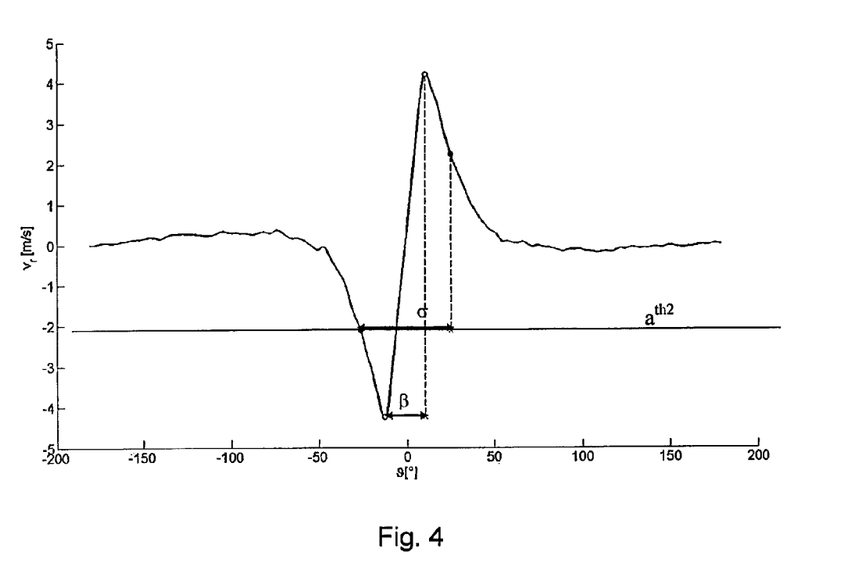
FIG. 4 shows a curve representative of an example of a speed radial component of a prefixed crown portion during at least one revolution of a tire.
Figure 5:
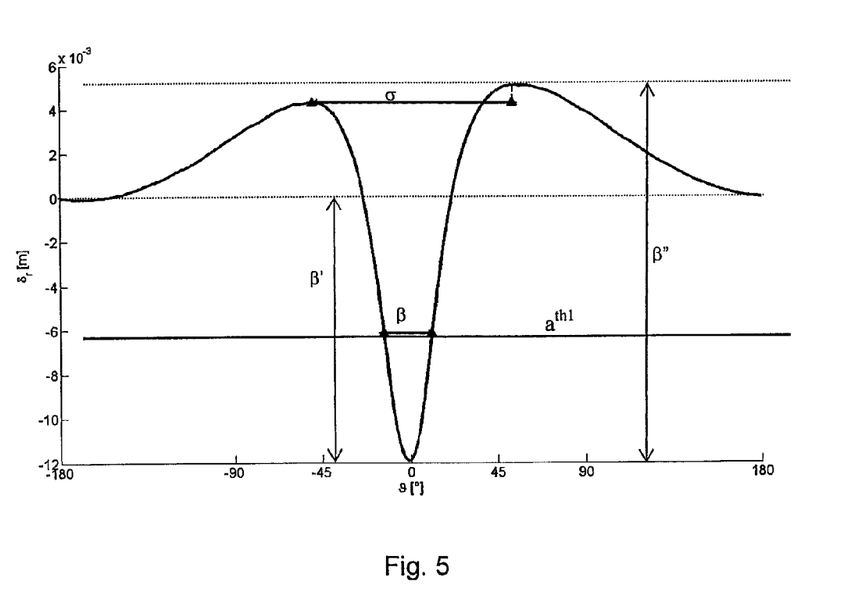
FIG. 5 shows a curve representative of an example of change in position, according to a radial direction of the tire, to which a prefixed crown portion is subjected with respect to the centre of the tire, during at least one revolution of a tire.
Figure 6:
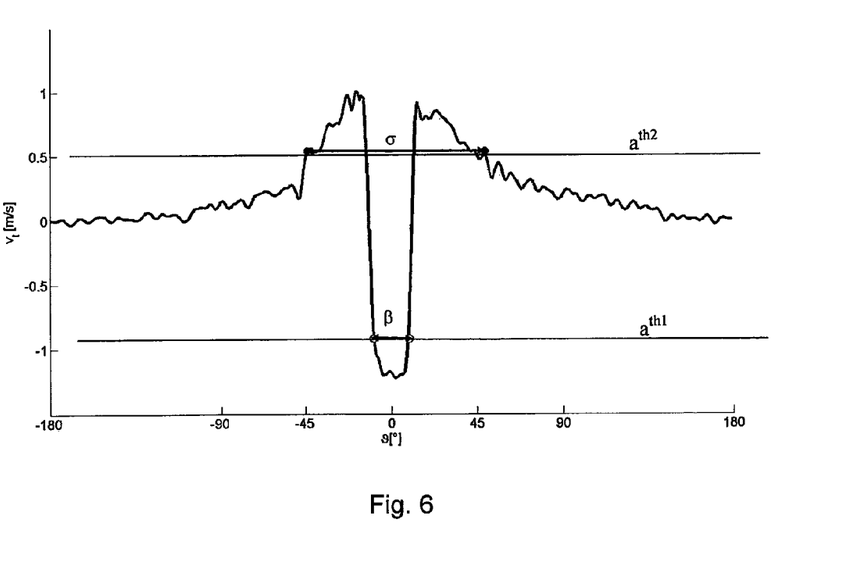
FIG. 6 shows a curve representative of a speed tangential component of a prefixed crown portion during at least one revolution of a tire.

In turn, FIGS. 4-6 respectively show examples of: a curve of speed radial component of a prefixed crown portion during at least one revolution of a tire, obtained by integrating the curve of FIG. 2; a curve of change of radial position of a prefixed crown portion with respect to the centre of the tire during at least one revolution of a tire, obtained by integrating the curve of FIG. 4; and a curve of a speed tangential (i.e. longitudinal) component of a prefixed crown portion during at least one revolution of a tire, obtained by processing the tangential acceleration component measured by the accelerometer 1. Also the curves of FIGS. 4-6 are represented as a function of the angular position θ of the accelerometer with respect to the centre of the footprint. In FIG. 5 the change of radial position is provided with respect to the radial position taken up by the prefixed crown portion in an undeformed region of the tire (the change of position therefore is null at a large distance from the footprint, for example in the top half of the tire, facing the vehicle).

As can be seen, all of the curves of FIGS. 2, 4-6 have a region with almost constant pattern and a region with variable pattern. The region with almost constant pattern corresponds to the situation in which the accelerometer (and the crown portion on which it is positioned) is very far from the footprint, where the tire is substantially undeformed. The region with variable pattern corresponds to the situation in which the accelerometer approaches, enters, passes through, exits and moves away from the footprint. Such a region substantially corresponds to the circumferential region 24 (see FIG. 1) in which the tire undergoes the deformation due to the contact with the rolling surface and to the deflection imparted by the load.

The curves of FIGS. 2, 4-6 are therefore representative of the deformation of the tire.

From such curves, the quantities β and σ can for example be determined as angular extensions of a first region, substantially corresponding to the footprint 22, and of a wider second region, comprising the footprint 22 (corresponding to at least a portion of the circumferential region 24). The first region will be typically comprised between the angular positions −20° and +20° whereas the second region will be typically comprised between the angular positions −90° and +90°. In practice, such quantities β and σ can be obtained by setting suitable thresholds (selected so as to identify the first and the second region) and by calculating the distance between the angles at which the curves cross the set thresholds.

Examples of quantities β and σ and of thresholds $a^{th2}$, $a^{th1}$ are shown in FIGS. 2, 4-6.

In particular, as shown in FIG. 2 in the case of a radial acceleration curve, the threshold $a^{th1}$ can be a fraction of a value of the acceleration radial component far from the footprint (which is about equal to the centrifugal acceleration of the tire and is indicated in the figures with a reference line S) whereas the threshold $a^{th2}$ can be a value greater than that of the acceleration radial component far from the footprint and in any case less than the maximum (in absolute value) reached by the acceleration radial component. For example, the threshold $a^{th2}$ can be calculated as a predetermined fraction of the maximum (in absolute value) reached by the radial acceleration. As an alternative to the two thresholds, it is also possible to use a single threshold (for example equal to the threshold $a^{th2}$ shown in FIG. 2). In this case the quantity β can be determined as angular distance between the two innermost points in which the curve crosses the threshold $a^{th2}$ whereas the quantity σ can be determined as angular distance between the two outer points in which the curve crosses the threshold $a^{th2}$.

In the case of the radial speed curve of FIG. 4, the quantity β can be advantageously determined as angular distance between the minimum value and the maximum value of the curve, whereas the quantity σ can be determined by using a threshold $a^{th2}$ that can, for example, be a predefined fraction of the minimum value or of the maximum value of the curve.

In the case of the curve of FIG. 5, the threshold $a^{th1}$ to be used to calculate the quantity β can be equal to a fraction (for example ½) of the maximum (in absolute value) of the curve. In turn, the quantity σ can be determined as angular distance between the two local maximums of the curve to the right and left of the centre of the footprint.

In the case of the curve of FIG. 6, analogous considerations to those made for FIG. 2 apply.

As stated above, as well as in terms of angular extension, the quantities β and σ can represent the extent of the deformation of the tire also in terms of change of position (for example according to a radial direction) undergone by a prefixed crown portion of the tire 2 with respect to a predetermined point of reference (for example the centre of the tire), during at least one revolution of a tire.

This is illustrated, for example, in FIG. 5 in which it is shown that the quantity representative of the extent of deformation within the footprint 22 can also be obtained by determining (in absolute value) the maximum of change of position (indicated in FIG. 5 with the symbol β') or the distance between a local maximum and minimum of the curve (indicated in FIG. 5 with the symbol β").

Moreover, in the case of the curve of FIG. 2, we observe that the quantity β can be represented from a parameter correlated with the steepness of transition of the curve of acceleration radial component at the inlet and/or outlet from the footprint. The steepness of transition of the curve of acceleration radial component is described in detail in Italian patent application No. MI2010A001789 (filed by the same Applicant and incorporated here by reference).

According to a variant, instead of using suitable thresholds, one or both quantities β and σ can be determined through an interpolation procedure that uses a parametric function of the type $$f=f(\theta|p_1 \ldots p_n)$$

where θ represents the angular position θ of the crown portion during a complete revolution of a tire and $p_1 \ldots p_n$ are parameters at least one of which is β and/or σ.

According to the interpolation procedure, revolution after revolution, the values of the parameters $p_1 \ldots p_n$ of the interpolation function are determined (for example by implementing an algorithm of the least squares) that enable to better approximate, through such an interpolation function, the data representative of the deformation of the tire.

Figure 3:
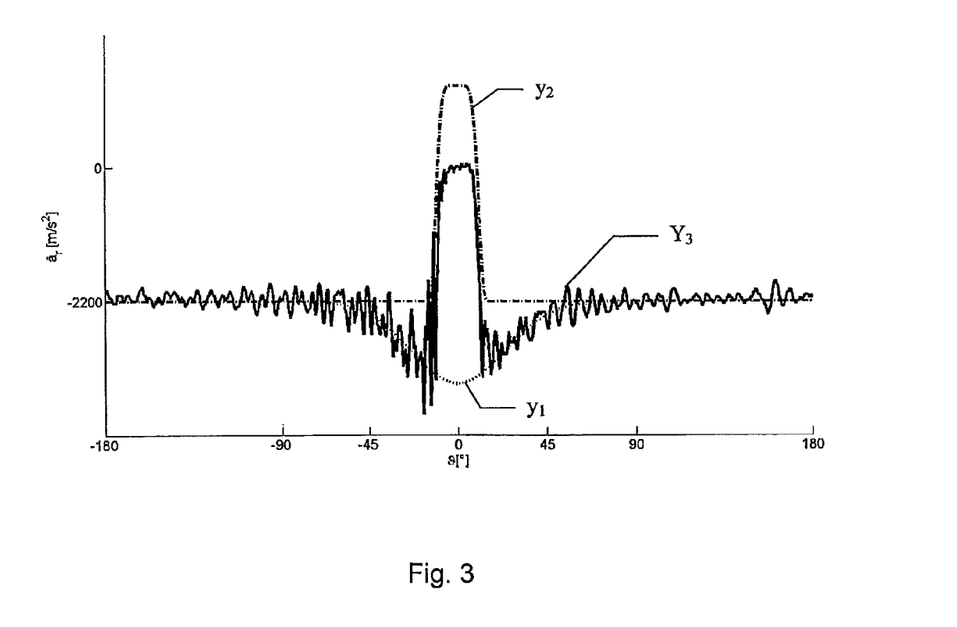
FIG. 3 shows two curves representative of two interpolation functions that can be used to determine the quantities β and σ shown in FIG. 2.

For example, when the data representative of the deformation are obtained from the acceleration radial component measured by the accelerometer and the quantities β and σ represent the angular extensions shown in FIG. 2, it is possible to use the following interpolation functions:

$$y_1(\vartheta|\sigma) \approx e^{-\frac{\vartheta^2}{2\sigma^2}}$$

$$y_2(\vartheta|\nu, \beta) \approx e^{-|\beta\vartheta|^\nu}$$

where, as shown in FIG. 3, $y_1$ is a function with Gaussian pattern whereas $y_2$ is a function with exponential pattern of a power of the angular position θ, which takes an almost zero value outside the footprint (defined by β). The interpolation procedure enables to find the values of β and σ that provide, through the functions $y_1$ and $y_2$ indicated above, the best approximation of the data obtained by the sensor (shown in FIG. 3 by the curve $Y_3$).

It should be observed that, advantageously, the data obtained by the accelerometer can be normalised according to a normalisation procedure.

Considering that the acceleration is typically linked to the electric signal provided by the accelerometer 1 (for example the voltage V) by means of a relationship of the type:

$$a=GV+V_{offset}$$

where G is the gain and $V_{offset}$ is the offset, the normalisation can advantageously be carried out so as to make the acceleration (or speed or change of position) values independent from the offset (by a subtraction operation) and from the gain (by a division operation) of the accelerometer 1.

This is very advantageous because it prevents having to perform laborious calibration operations of the accelerometer.

Once the quantities β and σ have been determined, the inflation pressure p of the tire can be estimated through a Fourier analysis, or through a combination (for example linear or, preferably, quadratic) of the quantities β and σ. An example of quadratic combination is the following:

$$p = b_{21} + b_{22}\sigma + b_{23}\beta + b_{24}\sigma\beta + b_{25}\sigma^2 + b_{26}\beta^2 \qquad (1)$$

Advantageously, considering that the quantities β and σ are also correlated with the load acting on the tire, they can also be used to estimate the load $F_z$ by carrying out a Fourier analysis, or by carrying out a combination (for example linear or, preferably, quadratic) of the quantities β and σ. An example of a quadratic combination is the following:

$$F_z = b_{11} + b_{12}\sigma + b_{13}\beta + b_{14}\sigma\beta + b_{15}\sigma^2 + b_{16}\beta^2 \qquad (2)$$

The coefficients $b_{ij}$ can be determined once, for each given tire specification, so as to best reproduce known reference values.

For example, the coefficients $b_{ij}$ can be obtained:
by determining (experimentally or through numeric simulations) a plurality of pairs of values of β and σ in a plurality of known pressure and load conditions, and
by determining, through an interpolation procedure (for example by implementing an algorithm of the least squares), the values of the parameters $b_{ij}$ that enable to best approximate, through the aforementioned functions (1) and (2), the plurality of known conditions of pressure, load and quantities β and σ.

The Applicant implemented such a procedure through FEA (Finite Element Analysis) simulations on a Pirelli P7 Cinturato™ 225/50 R17 tire and obtained the following values of the parameters $b_{ij}$:

$b_{11}$=2017
$b_{12}$=2263
$b_{13}$=1497
$b_{14}$=−1219
$b_{15}$=4706
$b_{16}$=3024
$b_{21}$=−2.37
$b_{22}$=−8.08
$b_{23}$=13.23
$b_{24}$=−54.95
$b_{25}$=30.62
$b_{26}$=37.75
for 25 different combinations of the following load and pressure values:
Fz=170, 337, 505, 675, 1015 kg;
p=1.2, 1.7, 2.1, 2.5, 3.0 bar.

In the simulations, it was considered a tire travelling in a straight line at a speed of 100 km/h in free rolling conditions (that is, in stationary rolling conditions) on a flat road. The quantities β and σ were determined from a curve of acceleration radial component. The quantity β was obtained by using a threshold whereas the quantity σ was obtained through an interpolation procedure using a Gaussian function, like the function $y_1$ shown in FIG. 3.

Once obtained the aforementioned values of the parameters $b_{ij}$, in order to evaluate the performance of the invention, the Applicant carried out FEA simulations in which the pressure and load values ($P_{est}$, $Fz_{est}$) were estimated by determining the quantities β and σ as just described and using the aforementioned functions (1) and (2).

The results of such simulations are shown in the table below, where: the first two columns indicate the known pressure and load reference values ($P_{ref}$ and $Fz_{ref}$), the third and the fourth column shown the estimated pressure and load values ($P_{est}$ and $Fz_{est}$) using the method of the invention and the last two columns indicate the difference (ΔP and ΔFz) between known reference values and estimated values.

| $P_{ref}$ [bar] | $Fz_{ref}$ [kg] | $P_{est}$ [bar] | $Fz_{est}$ [kg] | ΔP [bar] | ΔFz [kg] |
|---|---|---|---|---|---|
| 2.10 | 337 | 2.15 | 320 | −0.05 | 17 |
| 2.10 | 505 | 2.19 | 526 | −0.09 | −21 |
| 2.10 | 675 | 2.22 | 704 | −0.12 | −29 |
| 2.50 | 337 | 2.38 | 319 | 0.12 | 18 |
| 2.50 | 505 | 2.51 | 504 | −0.01 | 1 |
| 2.50 | 675 | 2.53 | 691 | −0.03 | −16 |
| 2.73 | 255 | 2.68 | 228 | 0.05 | 27 |
| 2.73 | 400 | 2.71 | 370 | 0.02 | 30 |
| 2.73 | 526 | 2.86 | 530 | −0.13 | −4 |
| 2.73 | 603 | 2.83 | 620 | −0.10 | −17 |
| 2.73 | 880 | 2.75 | 895 | −0.02 | −15 |
| 3.00 | 337 | 2.77 | 304 | 0.23 | 33 |
| 3.00 | 505 | 2.95 | 502 | 0.05 | 3 |
| 3.00 | 675 | 3.10 | 686 | −0.10 | −11 |

As evident from the results of the simulations, the method of the invention enables to estimate the inflation pressure and the load acting on the tire with good approximation.

The invention claimed is:

1. A method for estimating the inflation pressure of a tire, comprising:
obtaining data representative of deformation undergone by the tire on a rolling surface;
processing obtained data in order to obtain a first quantity representative of an extent of the deformation within a first deformation region substantially corresponding to a footprint between the tire and the rolling surface and a second quantity, different from the first quantity, representing extent of the deformation in a second deformation region, said second deformation region comprising the first deformation region and having a circumferential extension greater than a circumferential extension of the first deformation region, the second quantity being obtained starting from at least a part of the obtained data, which corresponds to a portion of said second deformation region which is external to the footprint; and
estimating the pressure on the basis of the first quantity and of the second quantity thus obtained.

2. The method according to claim 1, where the first quantity is representative of the circumferential extension of said first deformation region.

3. The method according to claim 1, wherein the first quantity is representative of a change of position undergone within the footprint by a prefixed crown portion, with respect to a predetermined point of reference.

4. The method according to claim 1, wherein the second quantity is representative of the circumferential extension of said second deformation region.

5. The method according to claim 1, wherein the data representative of said deformation are selected from: data representative of an acceleration component to which a prefixed crown portion is subjected, data representative of a speed component of a predetermined crown portion and data representative of a change of position of a prefixed crown portion with respect to a predetermined point of reference.

6. The method according to claim 1, wherein the data representative of the deformation are obtained by causing rotation of the tire on the rolling surface.

7. A system for estimating inflation pressure of a tire, comprising at least one processing unit adapted to:
- obtain data representative of deformation undergone by the tire on a rolling surface;
- process the obtained data in order to obtain a first quantity representative of deformation extent within a first deformation region substantially corresponding to a footprint between the tire and the rolling surface and a second quantity, different from the first quantity, representative of deformation extent in a second deformation region, said second deformation region comprising the first deformation region and having a circumferential extension greater than a circumferential extension of the first deformation region, the second quantity being obtained starting from at least a part of the obtained data, which corresponds to a portion of said second deformation region which is external to the footprint; and
- estimate the pressure on the basis of the first quantity and the second quantity thus obtained.

8. The system according to claim 7, further comprising the tire.

9. The system according to claim 8, further comprising a monitoring device operatively associated with the tire, said monitoring device adapted to obtain the data representative of said deformation.

10. The system according to claim 9, wherein the monitoring device is devoid of a direct pressure sensor.

11. The system according to claim 9, wherein said monitoring device comprises an accelerometer fixed on a crown portion on the tire.

12. The system according to claim 11, wherein the data representative of said deformation are obtained by said accelerometer.

13. The system according to claim 9, wherein said monitoring device comprises a sensor adapted to determine the position of a prefixed crown portion with respect to a predetermined point of reference.

* * * * *